United States Patent
Jackson (10) Patent No.: US 7,528,716 B2
(45) Date of Patent: *May 5, 2009

(54) METHODS, LOCATION CIRCUITS AND COMPUTER PROGRAM PRODUCTS FOR AUTOMATED LOCATION AND MONITORING OF MOBILE DEVICES

(75) Inventor: Stephen S. Jackson, Chapel Hill, NC (US)

(73) Assignee: RadarFind Corporation, Morrisville, NC (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/108,262

(22) Filed: Apr. 18, 2005

(65) Prior Publication Data

US 2006/0066450 A1  Mar. 30, 2006

Related U.S. Application Data

(60) Provisional application No. 60/610,066, filed on Sep. 15, 2004, provisional application No. 60/610,067, filed on Sep. 15, 2004, provisional application No. 60/610,068, filed on Sep. 15, 2004.

(51) Int. Cl.
*G08B 1/08* (2006.01)
*G08B 26/00* (2006.01)
*H04M 11/04* (2006.01)
*G05B 11/01* (2006.01)

(52) U.S. Cl. ............... 340/539.23; 340/539.13; 340/572.1; 340/825.36; 340/539.12; 340/538; 340/310.11

(58) Field of Classification Search ............. 340/539.32
See application file for complete search history.

(56) References Cited

U.S. PATENT DOCUMENTS

| 5,119,104 | A | 6/1992 | Heller |
| 5,887,176 | A | 3/1999 | Griffith et al. |
| 5,952,922 | A | 9/1999 | Shober |
| 6,429,810 | B1 * | 8/2002 | De Roche ............... 342/357.07 |
| 6,687,609 | B2 * | 2/2004 | Hsiao et al. ................. 701/207 |
| 7,038,584 | B2 | 5/2006 | Carter |
| 7,161,476 | B2 | 1/2007 | Hardman et al. |
| 7,312,752 | B2 | 12/2007 | Smith et al. |
| 7,324,824 | B2 | 1/2008 | Smith et al. |
| 7,336,182 | B1 | 2/2008 | Baranowski et al. |
| 2003/0112126 | A1 * | 6/2003 | Kubler et al. ............. 340/10.33 |
| 2004/0024644 | A1 * | 2/2004 | Gui et al. ....................... 705/22 |
| 2004/0027243 | A1 * | 2/2004 | Carrender ................. 340/568.1 |
| 2005/0285732 | A1 * | 12/2005 | Sengupta et al. ........ 340/539.12 |
| 2007/0197262 | A1 | 8/2007 | Smith et al. |
| 2008/0012767 | A1 | 1/2008 | Caliri et al. |

(Continued)

OTHER PUBLICATIONS

Radianse, Inc., "Technical Details of Indoor Positioning From Radianse," www.radianse.com/tech-details.html, May 2006.

*Primary Examiner*—Donnie L Crosland
(74) *Attorney, Agent, or Firm*—Myers Bigel Sibley & Sajovec (57) ABSTRACT

Methods are provided for providing location information associated with a mobile device. A request for presence information is transmitted from a location circuit to an identification circuit associated with the mobile device. The presence information is associated with the mobile device. The requested presence information is received at the location circuit responsive to the transmitted request. Related location circuits and computer program products are also provided.

34 Claims, 8 Drawing Sheets

U.S. PATENT DOCUMENTS

2008/0036661 A1 2/2008 Smith et al.
2008/0042901 A1 2/2008 Smith et al.
2008/0048914 A1 2/2008 Smith et al.
2008/0055158 A1 3/2008 Smith et al.

* cited by examiner

METHODS, LOCATION CIRCUITS AND COMPUTER PROGRAM PRODUCTS FOR AUTOMATED LOCATION AND MONITORING OF MOBILE DEVICES

CLAIM OF PRIORITY

This application claims priority to Provisional Application No. 60/610,066, filed on Sep. 15, 2004 entitled Apparatus and Method for Automatic Location of Portable Device and Process Thereof; Provisional Application No. 60/610,067, filed on Sep. 15, 2004, entitled Duty-Cycle Based Radio Frequency Polling Response Method and Apparatus; and Provisional Application No. 60/610,068 filed on Sep. 15, 2004, entitled Protocol for Digital Identification and Device and Method Therefore, the contents of which are incorporated herein by reference as if set forth in their entirety.

FIELD OF THE INVENTION

This invention relates to methods, devices and computer program products related to asset management and, more particularly, to methods, devices and computer program products for automated location and monitoring of assets.

BACKGROUND OF THE INVENTION

Asset management is becoming a major concern for companies, hospitals, schools, libraries and the like. In other words, as these institutions become larger, it is becoming increasing difficult to manage the location of assets or resources, for example, high-value, mobile assets or resources of which there is a limited quantity available, such as defibrillators. Thus, when one of the many patients in the hospital needs a defibrillator, it is important that the hospital personnel be able to locate a defibrillator for the patient and ascertain its status, for example, in use, available, broken and the like, in a timely manner. Asset management issues may also arise in institutions other than hospitals. For example, a large company may employ far more people than it has portable computers. Thus, when one of the employees needs a portable computer for a business trip, it is important that the employee be able to locate a portable computer and ascertain its status. However, as these institutions become larger, it may become increasingly difficult to monitor the location and status of these high-value, mobile resources. Inefficient asset management can lead to over allocation of funds to purchase more of the limited resources than necessary.

Currently, asset management may include manual asset searches, i.e., send a person to locate the asset, the use of bar codes affixed to the asset or the use of legacy radio frequency tags. However, each of these methods has drawbacks. For example, sending a person to locate an available device may be overly time consuming as well as unsuccessful. Affixing a barcode to the device may not provide any status information, may also be time consuming, unsuccessful and expensive. Legacy radio frequency tags may not provide any device status information, may not be designed for a particular institutions environment, may be expensive and disruptive to install.

A company by the name of Radianse, Inc., of Lawrence, Mass. has attempted to provide a more practical solution to asset management in a hospital environment. Radianse provides indoor positioning solutions (IPS) for healthcare institutions. In particular, Radianse IPSs use long-range active radio frequency identification (RFID) location technology for location and association of people, places and things. Information is shared using web and interface standards such as extensible markup language (XML) and short message service (SMS), and Radianse receivers directly connect to a hospital's existing local area network (LAN).

In particular, to track assets with a Radianse IPS, small, battery-powered transmitters (tags) are attached to mobile medical devices. The tags continuously transmit active RFID information and infrared signals to Radianse receivers plugged into a hospital's existing LAN. The Radianse receivers are standalone devices that are installed in various places in the hospital environment. The RFID information may be received by multiple receivers within a certain perimeter of the tag, but the infrared signal may only be received by the receivers in the same room as the tag due to the nature of infrared. Web-based location software analyzes and displays on a computer screen the exact location based on the RFID information and the infrared signal in real time. Data may also be stored for transfer to any standards-based clinical or hospital information system.

Since the Radianse tag continuously transmits to a reader, the battery life of the tag may only be from about a year to about 16 months, thus, tag replacement may be time consuming and costly. Furthermore, the use of infrared signals to pinpoint the exact location of the mobile medical device may be unreliable as anything placed between the tag and the receiver may block the receiver from receiving the infrared signal. Finally, the Radianse receivers are standalone devices that require installation and integration with the hospital system, which may be burdensome and costly. Accordingly, improved methods of asset management may be desired.

SUMMARY OF THE INVENTION

Some embodiments of the present invention provide methods for providing location information associated with a mobile device. A request for presence information is transmitted from a location circuit to an identification circuit associated with the mobile device. The presence information is associated with the mobile device. The requested presence information is received at the location circuit responsive to the transmitted request.

In further embodiments of the present invention, a request for the received presence information is received from a server at the location circuit. The received presence information is transmitted from the location circuit to the server responsive the received request for the received presence information. The received presence information may be stored and the stored presence information may be transmitted. The received requested presence information may be stored in a first in first out (FIFO) buffer and a time stamp may be affixed to the stored presence information.

In still further embodiments of the present invention, a name of the location circuit, a temperature around the location circuit and a current time may be transmitted to the server. An alert signal may be transmitted if the identification circuit is removed from within a certain proximity of the location circuit. The alert signal may be an audible signal, a visual signal or a combination an audible and a visual signal.

In some embodiments of the present invention, the requested presence information may be received at the location circuit from a plurality of identification circuits responsive to the transmitted request. A relevant identification circuit may be determined from among the plurality of identification circuits based on strengths of signals received from the plurality of identification circuits.

In further embodiments of the present invention, the request may be received over an existing power line. Similarly, the received presence information may be transmitted over the existing power line.

In still further embodiments of the present invention, the request may be transmitted multiple times so as to allow receipt at the identification circuit when the identification circuit is awake. The request may be transmitted using autosynchronous on/off keying (OOK) and the request may be received using frequency shift keying.

While described above primarily with reference to method aspects, it will be understood that the present invention further includes location circuit and computer program product aspects.

DETAILED DESCRIPTION OF EMBODIMENTS OF THE INVENTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated selectivity features, integers, steps, operations, elements, and/or components, but do not preclude the presence or addition of one or more other selectivity features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to block diagrams and/or flowchart illustrations of methods, systems, devices and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As discussed above, improved methods of asset management may be desired. Embodiments of the present invention that will be discussed with respect to FIGS. 1A through 10, provide methods, systems, devices and computer program products for providing location information associated with a mobile device. As used herein, "location information" can refer to a single response indicating the presence of a mobile device within a certain perimeter or a more in depth response including coordinates and signal strength. "Presence information" may specifically refer to a response indicating the presence of a mobile device within a certain perimeter of a location circuit according to some embodiments of the present invention. As further used herein, a "mobile device" refers to a device or resource capable of being moved from one place to another. In some embodiments of the present invention, the mobile device may be a high value mobile asset such as a defibrillator or a laptop computer. However, it will be understood that mobile devices according to some embodiments of the present invention may include library books, files and other lesser value resources without departing from the scope of the present invention. As discussed herein, methods, systems, devices and computer program products according to some embodiments of the present invention may address many of the short falls of conventional methods of asset management.

Figure 1A:
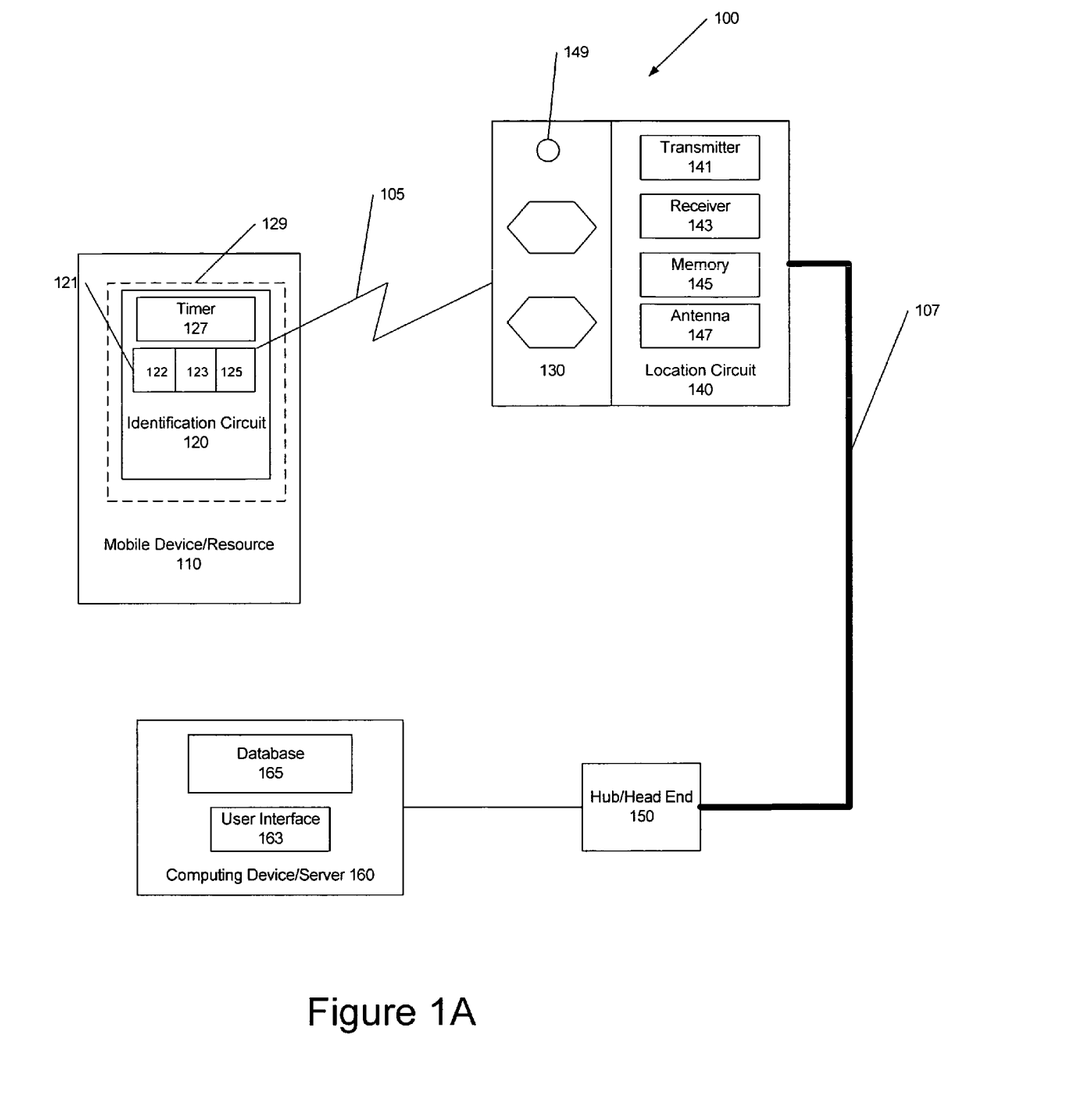
FIG. 1A is a block diagram illustrating a system according to some embodiments of the present invention.

Referring now to FIG. 1A, a system according to some embodiments of the present invention will be discussed. As illustrated in FIG. 1A, the system 100 includes a mobile device/resource 110, a location circuit 140, a hub/head end 150 and a computing device/server 160. Mobile devices 110 may be, for example, high-value, portable hospital equipment, such as a hospital bed, an infusion pump, an SCD, an electrocardiogram (EKG) device, a pulse oximeter, a vital signs monitor, a hypothermia machine, a kangaroo pump, a neonatal ventilator or the like. It will be understood that although embodiments of the present invention will be discussed with respect to hospital equipment and hospital environments, embodiments of the present invention are not limited to these environments. For example, some embodiments of the present invention may be used in, for example, school or corporate environments, to monitor the status and location of portable computers, books, files and the like without departing from the scope of the present invention.

As further illustrated in FIG. 1A, the mobile device 110 includes an identification circuit 120, which is configured to communicate with the location circuit 140 over a radio frequency RF link 105. It will be understood that although link 105 is discussed herein as an RF link, embodiments of the present invention are not limited to this configuration. The link 105 may be any type of communications link known to those having skill in the art without departing from the scope of the present invention.

The identification circuit 120 is associated with a mobile device 110 and, in some embodiments of the present invention, the identification circuit 120 is affixed to the mobile device 110 as illustrated in FIG. 1A. The identification circuit 120 may be, for example, an identification tag that may use radio frequencies to communicate. Details with respect to the radio frequency communications are known to those having skill in the art and, thus, only details specific to embodiments of the present invention will be discussed in detail herein. However, as will be understood by those having skill in the art, embodiments of the identification circuit 120 are not limited to identification tags using radio frequencies to communicate.

The identification circuit 120 is configured to receive signals from the location circuit 140 and transmit signals to the location circuit 140 over the RF link 105. The identification circuit 120 is configured to transmit information responsive to a request from the location circuit 140. In some embodiments of the present invention, the identification circuit 120 is battery powered. To conserve battery life, the identification circuit 120 (tag) is in a sleep mode most of the time. Thus, the battery used in identification circuits 120 according to some embodiments of the present invention may last significantly longer than those of conventional tags. For example, the battery life of a battery in an identification circuit 120 according to embodiments of the present invention may be about 6 years or more. Accordingly, the cost of affixing identification circuits 120 to mobile devices 110 may be reduced as well as battery replacement costs.

In particular, the identification circuit 120 is configured to periodically wake up from the sleep mode and listen for a request (beacon signal), for example, a request for presence information, from the location circuit 140. If the identification circuit 120 receives the request when it is awake, the identification circuit 140 is configured to transmit the requested presence information to the location circuit 140. In some embodiments of the present invention, the identification circuit 120 may be configured to have different levels of "awake" and "sleep." In these embodiments of the present invention, the identification circuit 120 may be configured to fully awake before responding to the request from the location circuit 140.

If, on the other hand, the identification circuit 120 does not receive the request within a predetermined period of time, the identification circuit 120 may return to sleep mode. The location circuit 140, which will be discussed further below, may be configured to transmit the request multiple times to ensure that the identification circuit 120 will receive the request when it is awake. As further illustrated in FIG. 1A, the identification circuit 120 may include a timer 127. The timer may be, for example, a back-off timer which is configured to indicate how long the identification circuit 120 can stay awake before going back to sleep. The timer 127 may be set to one or more microseconds so as not to consume a lot of the battery life. The timer 127 may also be used for collision avoidance between similarly located identification circuits 120. For example, if a first identification circuit has a back-off timer set to 2 microseconds (μs) and another identification circuit may have a back-off timer of 4 μs, the likelihood that the information they are transmitting to the location circuit 140 will intersect may be reduced.

The timer 127 may also be used to indicate when the identification circuit 120 should wake up. It will be understood that more than one timer may be provided without departing from the present invention. In other words, identification circuits 120 may have more than one sleep mode. The identification circuit 120 may be configured to detect that it has not received a request from the location circuit 140 in a significant period of time, for example, ten minutes or more. This may occur when a mobile device 110 having the identification circuit 120 affixed thereto is transported in an ambulance with a patient and is no longer within range of a location circuit. Once the identification circuit 120 realizes it has not received a request in a significant period of time, a value of the wake up timer may be increased so that the identification circuit wakes up more infrequently, for example, every 3 minutes. This feature may enable the battery life to be further increased.

According to some embodiments of the present invention, the time at which the identification circuit 120 will wake up may be determined randomly using, for example, time and frequency division multiplex control by prime coefficients for pseudo arbitrary channel efficiency. Using this method may increase the likelihood that the identification circuit 120 and the request (beacon) from the location circuit 140 will not be out of synch; i.e., decrease the likelihood that every time the identification circuit wakes up, the request has just come or is going to come after it goes to sleep. Thus, according to some embodiments of the present invention, the identification circuit wakes up randomly and, therefore, the likelihood of the identification circuit and the request being unsynchronized may be reduced.

Figure 1B:
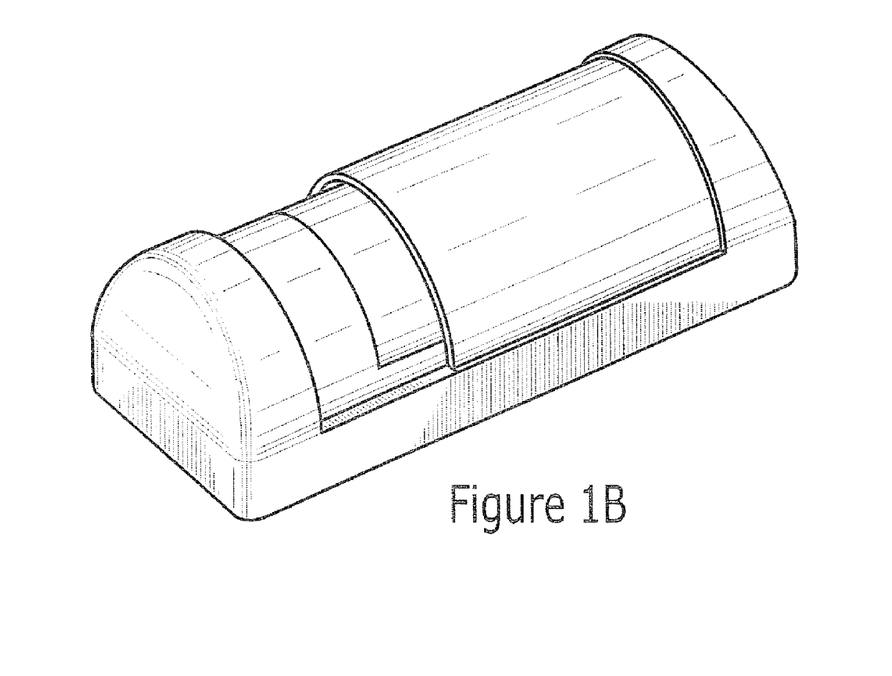
FIG. 1B is a perspective view of identification circuits according to some embodiments of the present invention

As further illustrated in FIG. 1A, the identification circuit 120 may further include a switch 121 that is configured to indicate a state of the mobile device 110. In some embodiments of the present invention, the switch 121 is a mechanical slide switch, not an electrical contact switch. Electrical contact switches may be corroded in the oxygen-enriched environment of the hospital, which may cause the switch to malfunction. A mechanical slide switch is not susceptible to this type of corrosion and, therefore, may be more reliable. Furthermore, the switch 121 may be color-coded, which may allow detection of the state of the device from across the room, which may be useful when searching for an available device. A perspective view of an identification circuit 120 including a color coded switch 121 according to some embodiments of the present invention is illustrated in FIG. 1B.

For example, a first portion 122 of the switch 121 may be red, which may indicate that the mobile device 110 is out of service, a second portion 123 of the switch 121 may be blue, which may indicate that the mobile device 110 is in use and a third portion 125 of the switch 125 may be green, which may indicate that the mobile device 110 is available or not in use. These colors may be visible from across the room and, therefore, returning to the console to determine the state of the mobile device 110 may not be necessary. It will be understood that although the switch 121 includes three states, embodiments of the present invention are not limited to this configuration. For example, the switch 121 may include two or four or more states without departing from the scope of the present invention.

In some embodiments of the present invention, the identification circuit 120 may be configured to operate on multiple frequencies. In other words, the identification circuit 120 is preloaded with different channel banks, A, B, C and so on. If the hospital happens to be using one frequency for another operation, then the frequency on which the identification circuit 120 receives and/or transmits can be changed so as not to interfere with current hospital frequency use. This feature may allow embodiments of the present invention to adapt to the hospitals' existing frequency and not to cause any disruption in the current operations thereof.

As further illustrated in FIG. 1A, the identification circuit 120 may be positioned on a printed circuit board (PCB) 129. The PCB 129 may be very thin and have a very thin trace thereon. If the identification circuit 120 is removed from the mobile device 110, the trace may be broken and the identification circuit 120 may be configured to provide a signal indicating that the trace has been broken responsive thereto. An alert signal, for example, an audible signal, a visual signal or a combination of both, may be provided responsive to the signal indicating removal of the identification circuit 120. For example, the location circuit 120 may be configured to provide the alert signal responsive to the signal indicating removal of the identification circuit 120.

It will be understood that removal of the identification circuit 120 may be detected using other techniques. For example, the identification circuit 120 may be provided in a cradle that is configured to attach to the mobile device 110. The cradle may be further configured to include a contact that may open and/or close a circuit. Once the circuit is closed when the cradle is attached to the mobile device 110, opening the circuit may cause a signal indicating removal of the identification circuit 120 from the mobile device 110 to be provided.

As discussed above, the identification circuit 120 communicates with the location circuit 140 (transcoder) over an RF link 105. In some embodiments of the present invention, the location circuit 140 may transmit to the identification circuit 120 using auto-synchronous on/off keying. This type of communication signal typically requires very little processing and power and, therefore, may further conserve the battery life of the identification circuit 140. Furthermore, in some embodiments of the present invention, the identification circuit 120 may communicate with the location circuit 140 using frequency shift keying. As discussed above, the location circuit 140 may be configured to transmit a request for presence information to the identification circuit 120 multiple times to ensure the reception of the request at the identification circuit 120 when the identification circuit 120 is awake.

As illustrated in FIG. 1A, location circuits 140 according to embodiments of the present invention are integrated with the existing infrastructure of the hospital. For example, the location circuit 140 of FIG. 1A is integrated with a non-critical outlet 130 already present in the hospital. Thus, location circuits 140 according to embodiments of the present invention may use the power lines 107 already present in the hospital and do not require a complicated installation procedure. In other words, the housing, wiring and the like are already present in the hospital. The use of existing infrastructure may significantly decrease the cost of implementing asset management according to some embodiments of the present invention, which is typically very important to the customer. It will be understood that although embodiments of the present invention are illustrated as being integrated with power outlets, embodiments of the present invention are not limited to this configuration. For example, a location circuit 140 may be integrated in an Exit sign or any device having access to the power lines without departing from the scope of the present invention.

As further illustrated in FIG. 1A, the location circuit 140 may include a transmitter 141, a receiver 143, a memory 145 and an antenna 147. The location circuit 140 is configured to communicate with the hub 150 over the power lines 107. Thus, the location circuit 140 according to some embodiments of the present invention is configured to communicate with the identification circuit 120 over an RF link 105 and with the hub 150 over the power line 107.

In some embodiments of the present invention, the location circuit 140 is a layer 2 processor, i.e. it may not be configured to process any information received from the identification circuit 120. Thus, the transmitter 141 of the location circuit 140 is configured to transmit a request for presence information (beacon signal) to the identification circuit 120 and the receiver 143 of the location circuit 140 is configured to receive the presence information from the identification circuit 120 and store the information received in the memory 145. The memory 145 may be a first in first out (FIFO). The receiver 143 of the location circuit 140 may be further configured to receive a request for the stored information from the hub 150 over the power line 107 and the transmitter 141 of the location circuit 140 may be further configured to transmit the stored information to the hub 150 over the power line 107 responsive to the request.

In some embodiments of the present invention, the presence information may be stored in the memory 145 with a time stamp. The time stamped information can be erased at will, which may aid in compliance with Health Insurance Portability and Accountability Act (HIPAA) regulations. Thus, the information can be deleted and the actual time of deletion may be recorded.

The location circuit 140 may only transmit information to the hub 50 upon request, for example, responsive to a poll from the hub 150. In some embodiments of the present invention, the information provided to the hub 150 responsive to the poll may include a name of the location circuit, the temperature at the location circuit, a current time, and a dump of all the information stored in the memory 145 (FIFO). The temperature may be provided as a precautionary measure to possibly avoid, for example, long term circuit damage or a fire. For example, if the temperature at the location circuit 140 is elevated, it may indicate a problem with the circuitry and, thus, may be addressed before a larger problem arises.

Figure 1C:
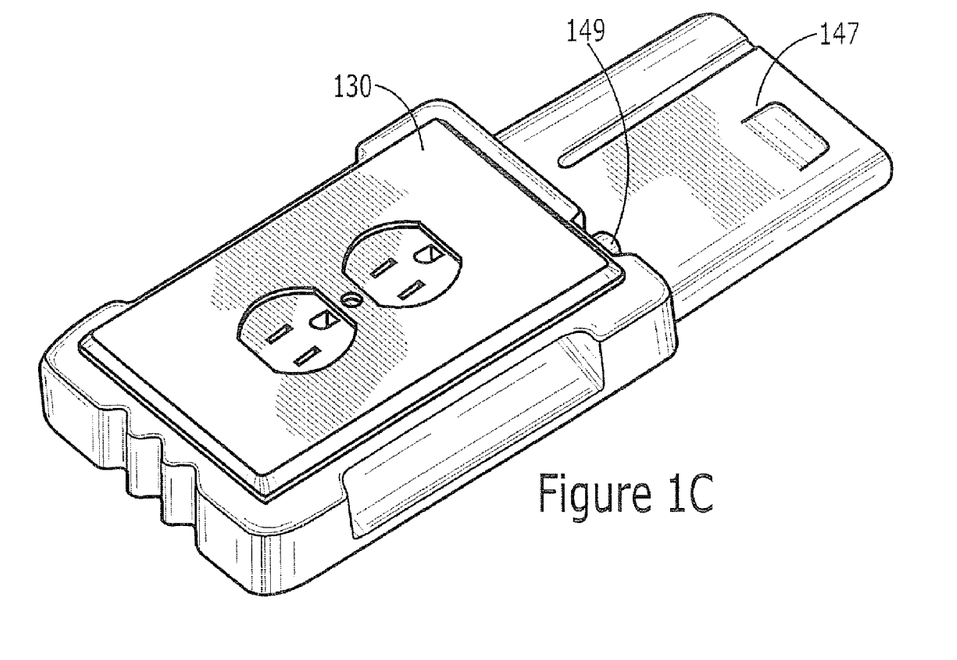
FIG. 1C is a perspective view of location circuits according to some embodiments of the present invention.

In some embodiments of the present invention, a location circuit 140 may be coupled to a light source 149, for example, a light emitting diode, as illustrated in FIG. 1A. The light source 149 may be mounted outside the outlet so as to be visible to hospital personnel. These particular location circuits 140 may be mounted near ingress/egress points in the hospital to provide an added level of security against, for example, theft of a mobile device. In other words, these location circuits 140 may operate similar to security tags provided on items sold in retail stores. For example, the location circuit 140 may be installed in an outlet and the light source 149 may be mounted in a visible location outside the outlet. Accordingly, if someone tries to remove a mobile device 110 having an identification circuit 120 affixed thereto from the hospital, the light source 149 may be configured to flash to indicate that a mobile device 110 was being removed from the hospital. In some embodiments, an audible alarm may also be configured to sound. It will be understood that the light source 149 is an optional feature of location circuits 140 according to embodiments of the present invention. However, all location circuits 140 may be capable of operating in conjunction with a light source 149 discussed above. A perspective view of location circuits 140 including a light source 149 and integrated with an outlet 130 according to some embodiments of the present invention is illustrated in FIG. 1C.

Figure 4:
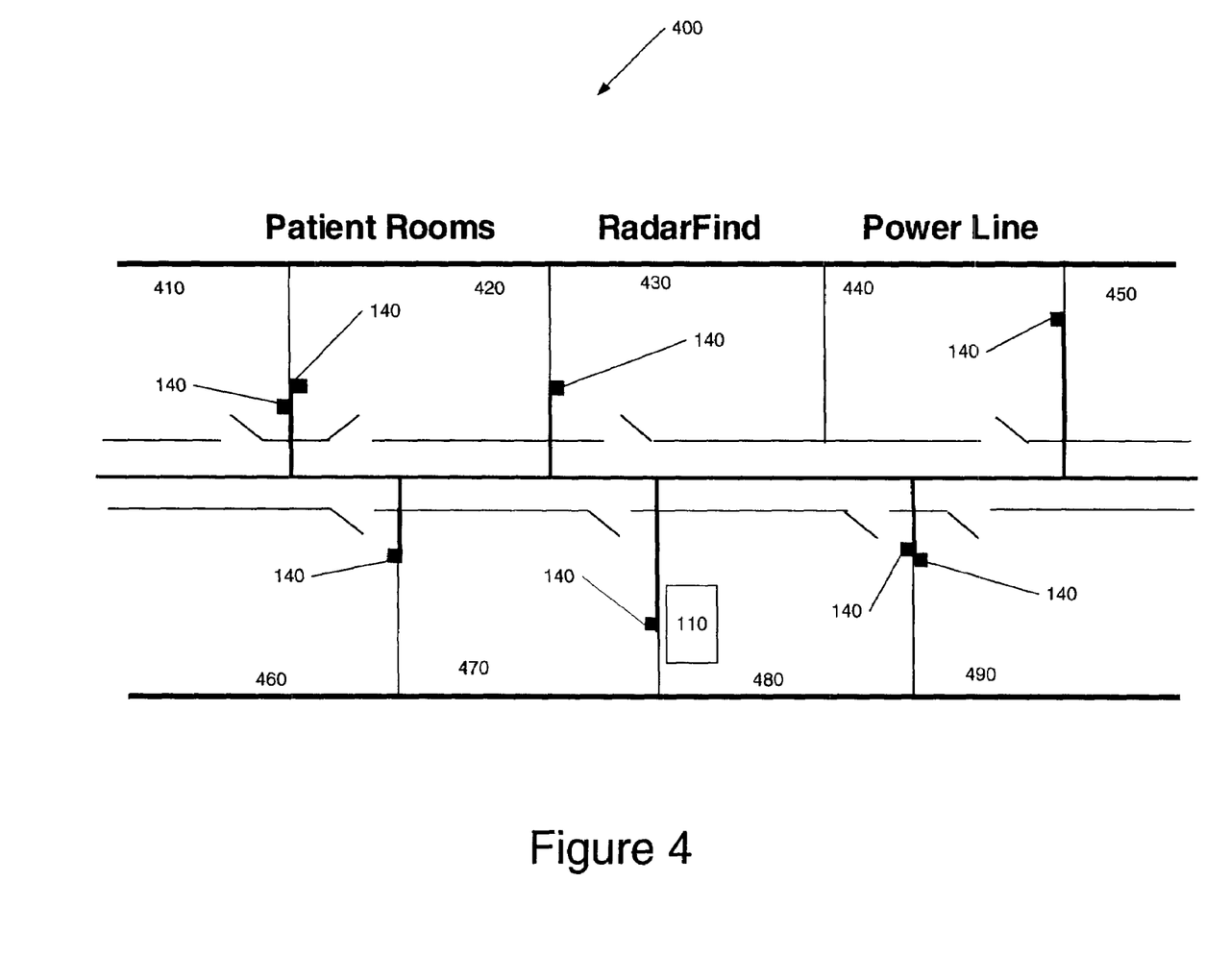
FIG. 4 is a diagram of a hospital floor equipped with devices according to some embodiments of the present invention.

As further illustrated in FIG. 1A, the location circuit 140 further includes an antenna 147. As discussed in the background of the invention, conventional tags use infrared signals to pinpoint a location of the mobile device 110. However, this method may be very unreliable. Antennas 147 according to embodiments of the present invention may allow the specific location of the mobile device 110 to be pinpointed based on signal strength, which may be much more reliable than infrared as signal strength does not depend on a clear line of sight. In particular, as illustrated in FIG. 4, location circuits 140 may be positioned in multiple hospital rooms 410 through 490 on a single hallway 400. A mobile device 110 having an identification circuit 120 according to some embodiments of the present invention may be positioned in a hospital room 480 but may be closer to the location circuit 140 in hospital room 470. Using an antenna according to embodiments of the present invention having a defined range, when the location circuits 140 send out requests (beacon signals) to the identification circuit(s) 120 and the identification circuit(s) 120 respond, the signal strength of the response will appear stronger to the location circuit 140 in hospital room 480 in which the device sits than to the location circuit 140 in hospital room 470. As used herein, a "defined range" refers to a controlled range so as to allow the discovery of a mobile device within the defined range to indicate a location/presence of the mobile device within a certain distance of the location circuit 140. Thus, according to some embodiments of the present invention signal strength may be used to pinpoint the location of the mobile device 110, which may be more reliable than the use of infrared as discussed above. Signal processing is known to those having skill in the art and, therefore, the details of the signal processing will not be discussed further herein.

Referring again to FIG. 1A, as discussed above, the hub 150 communicates with the location circuit(s) 140 over the power lines 107. The hub 150 may be positioned in an electrical closet at the hospital. The hub 150 is configured to obtain stored information from the location circuit(s) 140. Thus, the server transmits a request for stored information to the location circuit(s) 140 and receives the stored information from each of the location circuits 140. As discussed above, the hub 150 may further receive a name of the location circuit 140 in which the information was stored, a temperature around the location circuit and a current time. The hub 150 may store the received information in a database 165. Although the database 165 is illustrated as being a part of the computing device/server 160 in FIG. 1A, embodiments of the present invention are not limited to this configuration.

Figure 2:
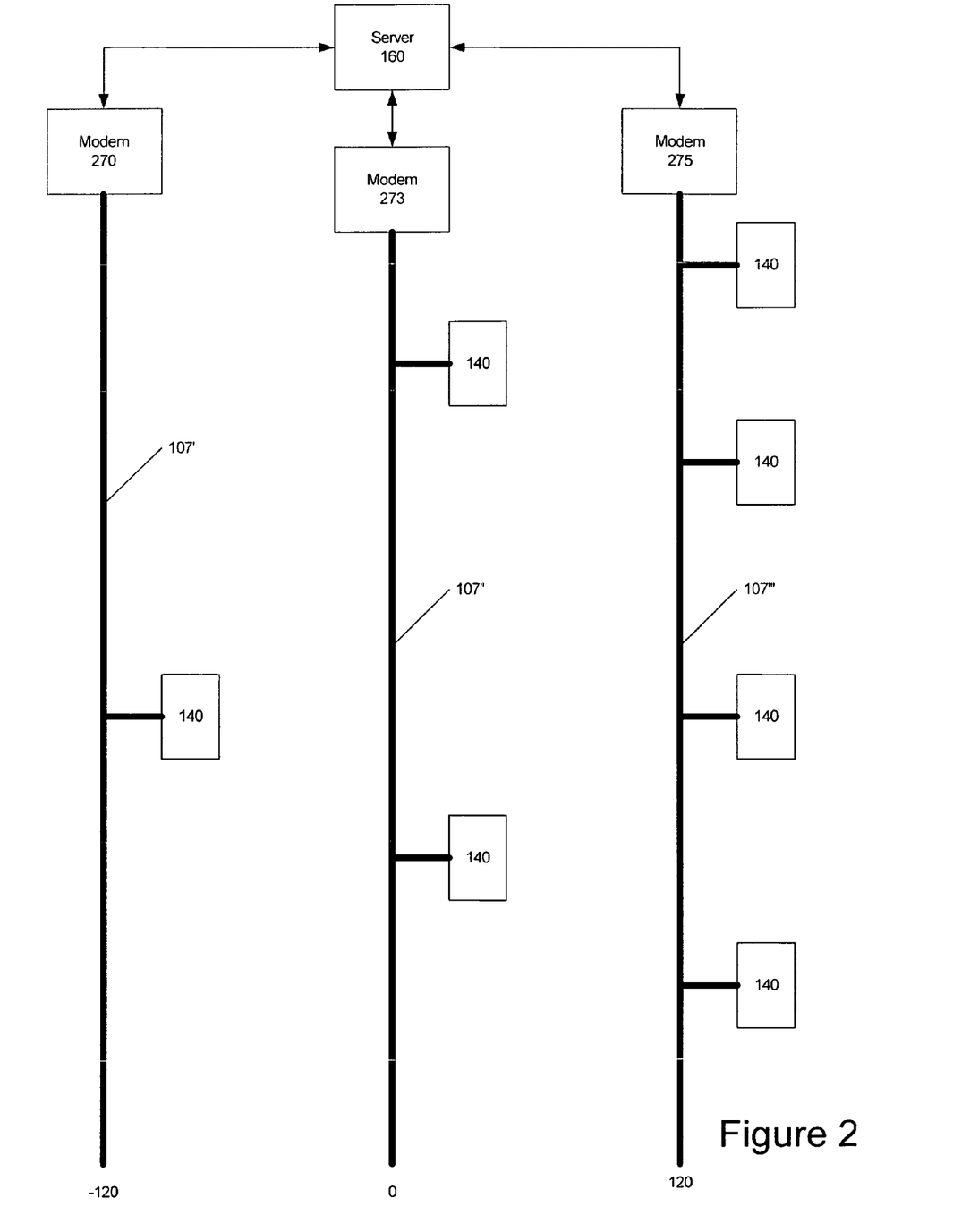
FIG. 2 is a block diagram illustrating a head end and a three phase power line according to some embodiments of the present invention.

As illustrated in FIG. 2 and will be understood by those having skill in the art, a power line 107 typically has three phases–120° (107'), 0° (107") and 120° (107'''). Thus, outlets 130 and, therefore, location circuits 140 integrated therewith, may be coupled to any one of the three phases 107', 107" and 107''' of the power line 107. The lines of each phase are isolated from starting loads on the other lines. As illustrated in FIG. 2, according to some embodiments of the present invention, a power line modem 270, 273 and 275 is placed on each of the three phases 107', 107" and 107''' of the power line 107. A request for stored information is transmitted from each of the power line modems 270, 273 and 275 at the simultaneously, which may significantly reduce the crosstalk between the lines. It will be understood that transmission from each of the power lines "simultaneously" refers to transmission at the same time plus or minus one or more phase differences. Furthermore, all of the location circuits 140 may transmit a response to the request at the same time. As illustrated in FIG. 2, some of the lines have more location circuits 140 attached thereto than others. In particular, a first phase 170' has a single location circuit 140 attached thereto, a second phase 170" has two location circuits 140 attached thereto and the third phase 170''' has four location circuits attached thereto. Thus, the lines having a smaller number of location circuits attached thereto have to wait until the line with the most location circuits attached thereto has received its last response before the process can be repeated. As further illustrated in FIG. 2, the information from each of the location circuits 140 may be stored in a database at the server 160 or at a computing device separate from the server 160. In some embodiments of the present invention, the server 160 is attached to the network clock so as to allow accurate timing of events.

Finally, as further illustrated in FIG. 1A, a computing device/server 160 includes a user interface 163 and the database 165. Although the computer device and server are illustrated as one unit in FIG. 1A, embodiments of the present invention are not limited to this configuration, these may be separate units without departing from the scope of the present invention. The database 165 may be customized according to customer preferences. As further illustrated in FIG. 1A, the computing device/server 160 is configured to communicate with the hub 150 using, for example, an Ethernet connection. The user interface 163 may include, for example, a graphical user interface (GUI). This GUI may be used to locate the mobile device 110 that is needed by the hospital personnel. For example, the GUI may contain a list of all the mobile devices 110 having identification circuits 120 affixed thereto. The type of device needed may be clicked on, which may then begin the process according to embodiments of the present invention for location of the needed mobile device 110. In particular, the hub 150 may be asked to poll the location circuits 140 to determine the location of the mobile device 110. As discussed above, the stored information received from the location circuit(s) 140 may be stored in the database 165 which may reside at the computing device/server 160.

It will be understood that although FIG. 1A includes a single mobile device 110 having an identification circuit 120 affixed thereto, a single location circuit 140 integrated with an outlet 130, a single a hub/head end 150 and a single computing device/server 160, embodiments of the present invention are not limited to this configuration. One or more of each of these elements may be included in the system 100 without departing from the scope of the present invention.

As illustrated in FIG. 1A, the system 100 according to some embodiments of the present invention includes four elements, a database 165, a hub 150 (head end), a location circuit 140 (transcoder) integrated with an outlet 130, and an identification circuit 120 (identification tag) affixed to a mobile device 110. Thus, systems according to some embodiments of the present invention combine Ethernet, power line, and RF communications.

Some embodiments of the present invention may use a voice XML session that interacts with the XML text to implement various functionalities of embodiments of the present invention. For example, hospital personnel trying to locate a mobile device 110 can call a device configured according to embodiments of the present invention. When the device receives the call, the X, Y and Z coordinates of the hospital personnel may be received as well as the extension from which they are calling. Thus, the positional information provided for the mobile device 110 located for the hospital personnel will not only be where the mobile device is, but will be the closest available mobile device relative to the hospital personnel's current position.

In some embodiments of the present invention, the identification circuit may only be configured to transmit presence information, i.e., in these embodiments of the present invention, the identification circuit may not receive requests from the location circuits. Identification circuits according to these embodiments of the present invention may be configured to keep track of, for example, a baby born at the hospital to reduce the likelihood that the baby will be stolen from the neonatal unit. Accordingly, identification circuits according to these embodiments of the present invention may include three frequency banks: "A" for the beacon (request), "B" for the beacon response (presence information), and "C" for the real time information with respect to patients and babies. It will be understood that identification circuits according to these embodiments of the present invention may used in conjunction with other objects and resources, for example, books in a library. Embodiments of the present invention may be configured to look for a particular tag (identification circuit) and if the identification circuit is located an alert may be transmitted.

Although embodiments of the present invention are discussed herein as having location circuits 140 integrated with outlets 130, embodiments of the present invention are not limited to this configuration. For example, some embodiments of the present invention may be implemented without the identification circuit. In particular, the radio in the transcoder (location circuit) may be replaced with different sensors, for example, microphones, spy chips, humidity sensors, temperature sensors, and the like. A spy chip may be used to locate electronic bugs in government buildings and the device may be configured to transmit an alert whenever a bug, a Bluetooth transceiver or a cell phone that shouldn't be there is found. These embodiments of the present invention may also be configured to locate when and where the unwanted activity is happening so that it can possibly be stopped.

Figure 3:
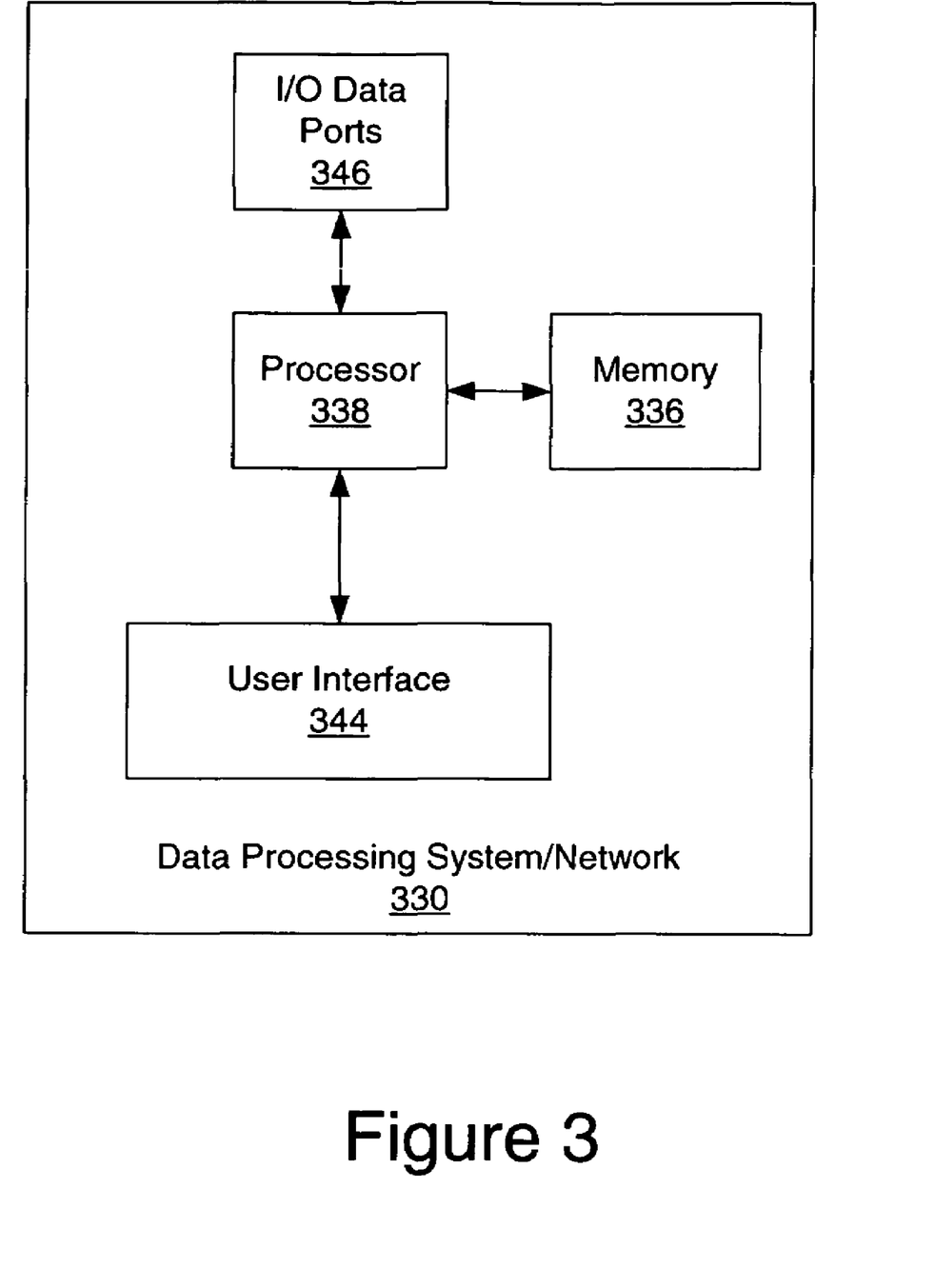
FIG. 3 is a block diagram of a data processing system suitable for use in devices according to some embodiments of the present invention.

FIG. 3 illustrates an exemplary embodiment of a data processing system 330, which may be included in devices, for example, computing device 160 and hub 150, in accordance with some embodiments of the present invention. The data processing system 330 may include a user interface 344, including, for example, input device(s) such as a keyboard or keypad, a display, a speaker and/or microphone, and a memory 336 that communicate with a processor 338. The data processing system 330 may further include an I/O data port(s) 346 that also communicates with the processor 338. The I/O data ports 346 can be used to transfer information between the data processing system 330 and another computer system or a network using, for example, an Internet Protocol (IP) connection. These components may be conventional components such as those used in many conventional data processing systems, which may be configured to operate as described herein.

The processor 338 can be any commercially available or custom enterprise, application, personal, pervasive and/or embedded microprocessor, microcontroller, digital signal processor or the like. The memory 336 may include any memory devices containing the software and data used to implement the functionality of the data processing system 330. The memory 336 can include, but is not limited to, the following types of devices: ROM, PROM, EPROM, EEPROM, flash memory, SRAM, and DRAM.

Furthermore, the memory 336 may include several categories of software and data used in the system, for example, an operating system; application programs; input/output (I/O) device drivers; and data. As will be appreciated by those of skill in the art, the operating system may be any operating system suitable for use with a data processing system, such as OS/2, AIX or zOS from International Business Machines Corporation, Armonk, N.Y., Windows95, Windows98, Windows2000 or WindowsXP, or Windows CE from Microsoft Corporation, Redmond, Wash., Palm OS, Symbian OS, Cisco IOS, VxWorks, Unix or Linux. The I/O device drivers typically include software routines accessed through the operating system by the application programs to communicate with devices such as the I/O data port(s) 346 and certain memory 336 components. The application programs are illustrative of the programs that implement the various features of the system and preferably include at least one application that supports operations according to embodiments of the present invention. Finally, the data may represent the static and dynamic data used by the application programs, the operating system, the I/O device drivers, and other software programs that may reside in the memory 336.

Figure 5:
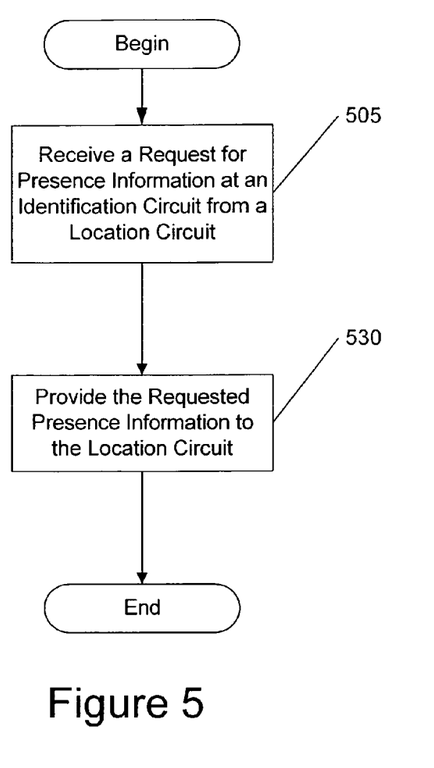
FIGS. 5 through 10 are flowcharts illustrating operations according to various embodiments of the present invention.

Operations according to various embodiments of the present invention will now be further described with reference to the flowchart illustrations of FIGS. 5 through 10. Referring first to FIG. 5, methods for providing location information associated with a mobile device according to some embodiments of the present invention will be discussed. Operations begin at block 505 by receiving a request for presence information at an identification circuit associated with the mobile device. The request may be received over an RF link. The identification circuit may be, for example, an identification tag and the "presence information" may be a response indicating the presence of the identification circuit. It will be understood that in some embodiments of the present invention, the request may be for "location information", which may be a more detailed response including location coordinates. The request or beacon signal may be received from a location circuit, for example, a transcoder, within a predetermined proximity of the identification circuit. The location circuit may be integrated with the power outlets and communicate over the existing power lines. The requested presence information may be provided to the location circuit responsive to the request for presence information (block 530). The requested information may be provided over the RF link.

Figure 6:
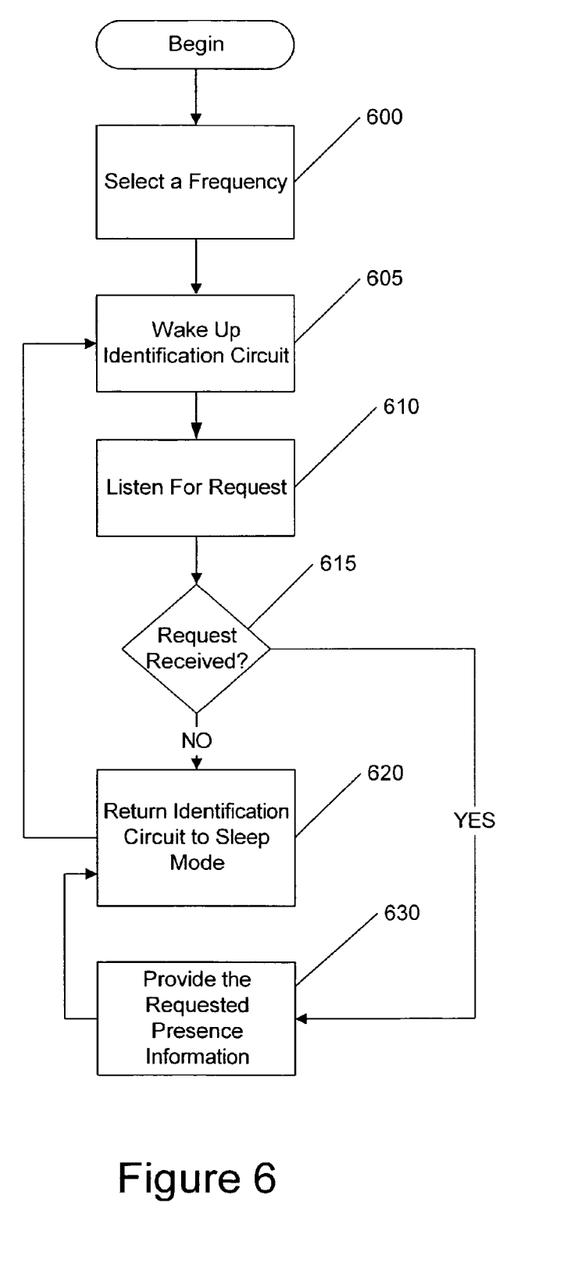

Referring now to FIG. 6, methods for providing location information associated with a mobile device according to some embodiments of the present invention will be discussed. Operations begin at block 600 by selecting a frequency on which an identification circuit according to embodiments of the present invention will transmit and/or receive. The identification circuit may wake up from a sleep mode so as to allow the identification circuit to receive a request (block 605). Once the identification circuit is awake, the identification circuit may listen for the request for presence information (block 610). It is determined if a request for presence information has been received from the location circuit at the identification circuit within a predetermined period of time when the identification circuit was awake (block 615). In some embodiments of the present invention, the predetermined period of time may be randomly determined and tracked by a timer included in the identification circuit. It will be understood that in some embodiments of the present invention the predetermined period of time may be increased if the request for presence information is not received within a second predetermined period of time, greater than the first predetermined period of time.

If is it determined that a request has not been received (block 615), the identification circuit returns to the sleep mode (block 620) and operations return to block 605 and repeat until a request is received while the identification circuit is awake. If it is determined that the request has been received (block 615), the requested information may be provided to the location circuit (block 630). Once the requested information has been provided (block 630), the identification circuit is returned to sleep mode (block 620) and operations return to block 605 and repeat until another request is received at the identification circuit.

Figure 7:
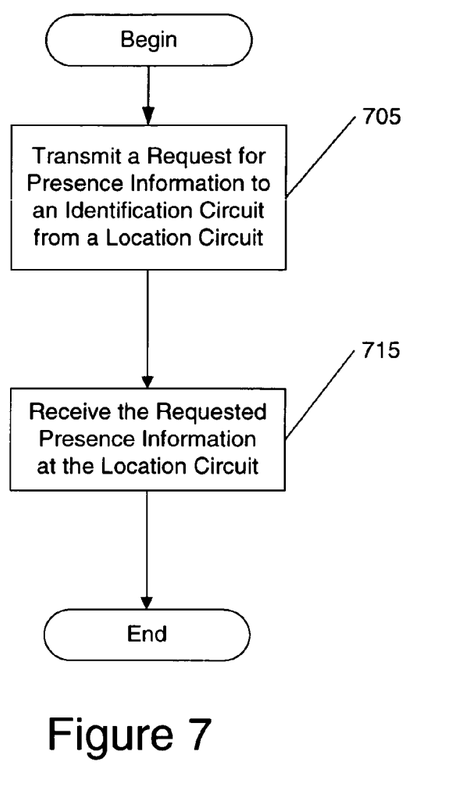

Referring now to FIG. 7, methods for providing location information associated with a mobile device according to further embodiments of the present invention will be discussed. Operations begin at block 705 by transmitting a request for presence information associated with the mobile device from a location circuit to an identification circuit associated with the mobile device. The location circuit may be integrated with an existing outlet and the identification circuit may be affixed to the mobile device. The requested presence information is received at the location circuit responsive to the transmitted request from the identification circuit affixed to the mobile device (block 715).

Figure 8:
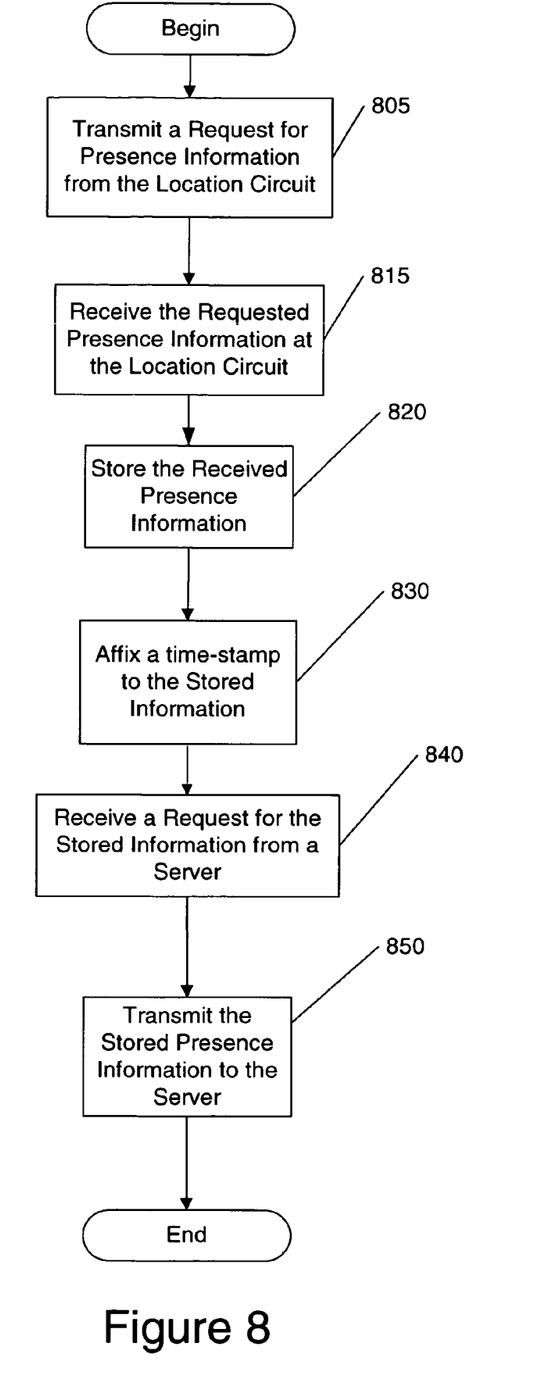

Referring now to FIG. 8, methods for providing location information associated with a mobile device according to some embodiments of the present invention will be discussed. Operations begin at block 805 by transmitting a request for presence information associated with the mobile device from a location circuit to an identification circuit associated with the mobile device. In some embodiments of the present invention, the request for presence information may be transmitted multiple times so as to allow receipt at the identification circuit when the identification circuit is awake.

The requested presence information is received at the location circuit responsive to the transmitted request from the identification circuit affixed to the mobile device (block 815). In some embodiments of the present invention, the location circuit may receive presence information from more than one identification circuit responsive to the request. In these embodiments of the present invention, signal strength may be used to determine the relevant identification circuit from among the plurality of identification circuits as discussed above.

The received presence information may be stored at the location circuit (block 820). In some embodiments of the present invention, the presence information may be stored in a FIFO and a time stamp may be affixed to each entry in the FIFO (block 830).

A request may be received, from a server, at the location circuit for the stored presence information (block 840). The request may be received at the location circuit over the power lines. The stored presence information may be transmitted to the server from the location circuit responsive to the received request (block 850). The transmitted information may further include a name of the location circuit providing the stored information, a temperature of the environment in which the location sits and a current time.

Figure 9:
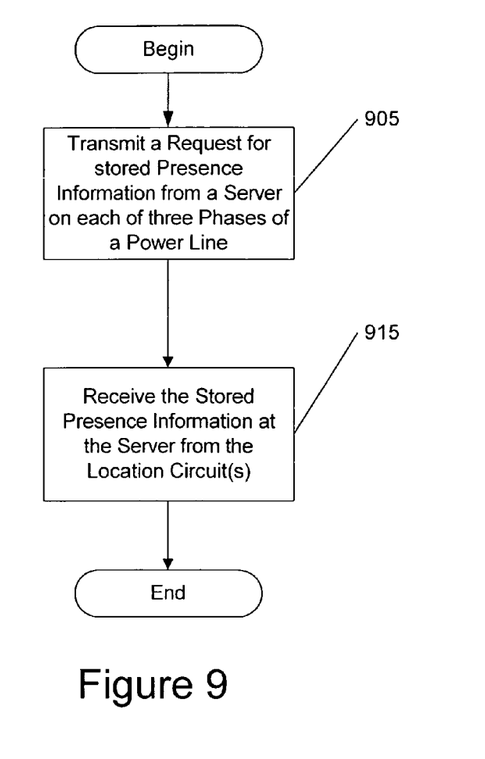

Referring now to FIG. 9, methods for providing location information associated with a mobile device according to further embodiments of the present invention will be discussed. Operations begin at block 905 by transmitting, from a server, a request for location information stored at one or more location circuits on one of three phases of a power line. In some embodiments of the present invention a power line modem is provided on each of three phases of a power line. Each of the modems may be configured to transmit a request for stored location information simultaneously as discussed in detail with respect to FIG. 2. The stored location information may be received at the server on each of the three phases of the power line responsive to the transmitted request (block 915).

Figure 10:
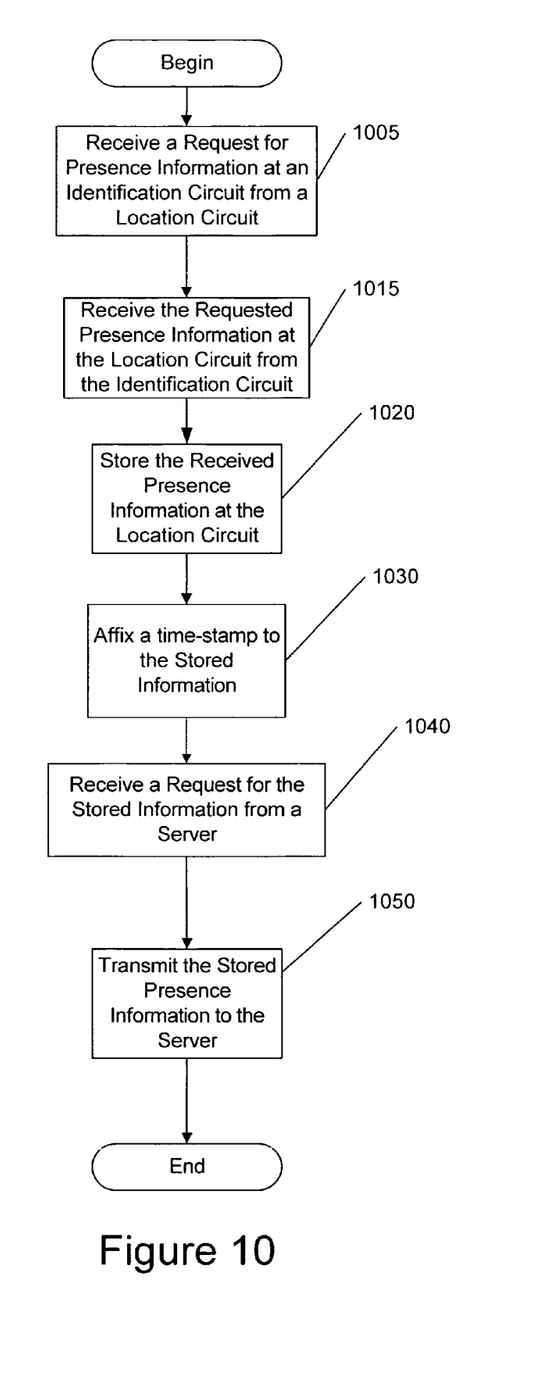

Referring now to FIG. 10, methods for providing location information associated with a mobile device according to still further embodiments of the present invention will be discussed. Operations begin at block 1005 by receiving at an identification circuit a request for presence information associated with the mobile device from a location circuit. The requested presence information is received at the location circuit responsive to the request from the identification circuit affixed to the mobile device (block 1015). In some embodiments of the present invention, the location circuit may receive presence information from more than one identification circuit responsive to the request. In these embodiments of the present invention, signal strength may be used to determine the relevant identification circuit from among the plurality of identification circuits as discussed above.

The received presence information may be stored at the location circuit (block 1020). In some embodiments of the present invention, the presence information may be stored in a FIFO and a time stamp may be affixed to each entry in the FIFO (block 1030).

A request may be received, from a server, at the location circuit for the stored location/presence information (block 1040). The request may be received at the location circuit over the power lines. The stored location information may be transmitted to the server from the location circuit responsive to the received request (block 1050). The transmitted information may further include a name of the location circuit providing the stored information, a temperature of the environment in which the location sits and a current time.

As discussed briefly above with respect to FIGS. 1A through 10, methods, systems, devices and computer program products according to some embodiments of the present invention may provide improved asset management capabilities.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method for providing location information associated with a mobile device, comprising:
    transmitting, from a location circuit positioned within or in close proximity to a defined structure, a request for presence information associated with the mobile device within or in close proximity to the defined structure to an identification circuit associated with the mobile device, the requested presence information indicating the presence of the mobile device within a certain perimeter of the location circuit within or in close proximity to the defined structure; and
    receiving the requested presence information at the location circuit responsive to the transmitted request.

2. The method of claim 1, further comprising:
    receiving, from a server, at the location circuit a request for the received presence information; and
    transmitting the received presence information from the location circuit to the server responsive the received request for the received presence information.

3. The method of claim 2, wherein receiving a request for the received presence information is preceded by storing the received presence information and wherein transmitting further comprises transmitting the stored presence information.

4. The method of claim 3, wherein storing comprises:
    storing the received requested presence information in a first in first out (FIFO) buffer; and
    affixing a time stamp to the stored presence information.

5. The method of claim 3, wherein transmitting further comprises transmitting a name of the location circuit, a temperature around the location circuit and a current time.

6. The method of claim 1, further comprising transmitting an alert signal if the identification circuit is removed from within a certain proximity of the location circuit.

7. The method of claim 1, wherein receiving further comprises:
    receiving, from a plurality of identification circuits, the requested presence information at the location circuit responsive to the transmitted request; and
    determining a relevant identification circuit from among the plurality of identification circuits based on strengths of signals received from the plurality of identification circuits.

8. The method of claim 2, wherein receiving a request for the received presence information comprises receiving a request over an existing power line and wherein transmitting the received presence information comprises transmitting the requested presence information over the existing power line.

9. The method of claim 1, further comprising repeating transmitting multiple times so as to allow receipt at the identification circuit when the identification circuit is awake.

10. The method of claim 1, wherein transmitting comprises transmitting using auto-synchronous on/off keying (OOK) and wherein receiving comprises receiving using frequency shift keying.

11. The method of claim 1, wherein the location circuit is located within about three hundred square feet of the mobile device.

12. The method of claim 1, wherein transmitting further comprises synchronously transmitting, to a plurality of identification circuits associated with corresponding mobile devices within or in close proximity to the defined structure from a location circuit within or in close proximity to the defined structure, a request for presence information associated with the plurality of mobile devices.

13. The method of claim 12, wherein transmitting is followed by:
    receiving the request at one or more of the plurality of identification circuits when the one or more of the plurality of identification circuits are awake and prepared to receive the request.

14. A location circuit positioned within or in close proximity to a defined structure associated with a mobile device, comprising:
    a transmitter configured to transmit a request for presence information associated with the mobile device within or in close proximity to the defined structure to an identification circuit associated with the mobile device, the requested presence information indicating the presence of the mobile device within a certain perimeter of the location circuit within or in close proximity to the defined structure; and
    a receiver configured to receive the requested presence information responsive to the transmitted request.

15. The location circuit of claim 14, wherein the location circuit is configured to be integrated with existing power outlets.

16. The location circuit of claim 14, wherein the location circuit comprises a layer two processor.

17. The location circuit of claim 14, wherein the receiver is further configured to receive, from a server, a request for the received presence information and wherein the transmitter is further configured to transmit the received presence information to the server responsive the received request for the received presence information.

18. The location circuit of claim 17, further comprising a memory configured to store the received requested presence information and wherein the transmitter is further configured to transmit the stored presence information.

19. The location circuit of claim 18, wherein the memory comprises a first in first out (FIFO) buffer and wherein the FIFO buffer is further configured to affix a time stamp to the stored presence information.

20. The location circuit of claim 18, wherein the transmitter is further configured to transmit a name of the location circuit, a temperature around the location circuit and a current time.

21. The location circuit of claim 14, further comprising a visible light source that is configured to provide an alert signal if the identification circuit is removed from within a certain proximity of the location circuit.

22. The location circuit of claim 14, wherein the receiver is further configured to receive, from a plurality of identification circuits, the requested presence information responsive to the transmitted request and determine a relevant identification circuit from among the plurality of identification circuits based on strengths of signals received from the plurality of identification circuits.

23. The location circuit of claim 14, wherein the receiver is further configured to receive the request over an existing power line and wherein the transmitter is further configured to transmit the requested presence information over the existing power line.

24. The location circuit of claim 14, wherein the transmitter is further configured to repeatedly transmit the request multiple times so as to allow receipt at the identification circuit when the identification circuit is awake.

25. A computer program product loaded into the internal memory of a computer providing location information associated with a mobile device, comprising:
 a computer readable medium having computer readable program code embodied therein, the computer readable medium comprising:
  computer readable program code configured to transmit, from a location circuit positioned within or in close proximity to a defined structure, a request for presence information associated with the mobile device within or in close proximity to the defined structure to an identification circuit associated with the mobile device, the requested presence information indicating the presence of the mobile device within a certain perimeter of the location circuit within or in close proximity to the defined structure; and
  computer readable program code configured to receive the requested presence information at the location circuit responsive to the transmitted request.

26. The computer program product of claim 25, further comprising:
 computer readable program code configured to receive, from a server, at the location circuit a request for the received presence information; and
 computer readable program code configured to transmit the received presence information from the location circuit to the server responsive the received request for the received presence information.

27. The computer program product of claim 26, further comprising computer readable program code configured to store the received presence information and wherein the computer readable program code configured to transmit further comprises computer readable program code configured to transmit the stored presence information.

28. The computer program product of claim 27, wherein the computer readable program code configured to store comprises:
 computer readable program code configured to store the received presence information in a first in first out (FIFO) buffer; and
 computer readable program code configured to affix a time stamp to the stored presence information.

29. The computer program product of claim 27, wherein the computer readable program code configured to transmit further comprises computer readable program configured to transmit a name of the location circuit, a temperature around the location circuit and a current time.

30. The computer program product of claim 25, further comprising computer readable program code configured to transmit an alert signal if the identification circuit is removed from within a certain proximity of the location circuit.

31. The computer program product of claim 25, wherein the computer readable program code configured to receive further comprises:
 computer readable program code configured to receive, from a plurality of identification circuits, the requested presence information at the location circuit responsive to the transmitted request; and
 computer readable program code configured to determine a relevant identification circuit from among the plurality of identification circuits based on strengths of a signal received from the plurality of identification circuits.

32. The computer program product of claim 26, wherein the computer readable program code configured to receive a request for the received presence information comprises computer readable program code configured to receive a request over an existing power line and wherein the computer readable program code configured to transmit the received presence information further comprises computer readable program code configured to transmit the received presence information over the existing power line.

33. The computer program product of claim 25, further comprising computer readable program code configured to repeatedly transmit the request multiple times so as to allow receipt at the identification circuit when the identification circuit is awake.

34. A location circuit positioned within or in close proximity to a defined structure associated with a mobile device within or in close proximity to the defined structure, the location circuit being configured to be integrated with existing power outlets, the location circuit comprising:
 a transmitter configured to transmit a request for presence information associated with the mobile device to an identification circuit associated with the mobile device, the requested presence information indicating the presence of the mobile device within a certain perimeter of the location circuit within or in close proximity to the defined structure; and
 a receiver configured to receive the requested presence information responsive to the transmitted request.

* * * * *